US008498560B2

(12) United States Patent
Sakaya et al.

(10) Patent No.: US 8,498,560 B2
(45) Date of Patent: Jul. 30, 2013

(54) FIXING DEVICE AND IMAGE FORMING APPARATUS USING THIS FIXING DEVICE

(75) Inventors: Kohta Sakaya, Osaka (JP); Shigeo Nanno, Kyoto (JP); Tamotsu Ikeda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 672 days.

(21) Appl. No.: 12/289,831

(22) Filed: Nov. 5, 2008

(65) Prior Publication Data

US 2009/0129836 A1 May 21, 2009

(30) Foreign Application Priority Data

Nov. 19, 2007 (JP) ................................. 2007-298834

(51) Int. Cl.

| | |
|---|---|
| ***G03G 15/00*** | (2006.01) |
| ***B41J 2/385*** | (2006.01) |
| ***H05B 1/00*** | (2006.01) |
| ***F16H 55/14*** | (2006.01) |

(52) U.S. Cl.

USPC ........... 399/328; 399/167; 399/320; 399/331; 347/156; 219/216; 74/10.8; 74/443; 74/451

(58) Field of Classification Search

USPC ...... 399/167, 328, 331; 74/332, 414; 219/216

See application file for complete search history.

(56) References Cited

U.S. PATENT DOCUMENTS

| | | | | |
|---|---|---|---|---|
| 3,443,449 | A * | 5/1969 | Kotarski | 74/422 |
| 5,184,952 | A * | 2/1993 | Nishikawa et al. | 432/60 |
| 5,659,848 | A * | 8/1997 | Jeon | 399/122 |
| 5,749,031 | A * | 5/1998 | Miwa et al. | 399/228 |
| 6,983,118 | B2 * | 1/2006 | Jaskowiak et al. | 399/330 |
| 7,127,203 | B1 * | 10/2006 | Pitts | 399/328 |
| 7,509,075 | B2 * | 3/2009 | Hayakawa | 399/167 |
| 7,853,163 | B2 * | 12/2010 | Katsura et al. | 399/68 |
| 7,995,958 | B2 * | 8/2011 | Gon et al. | 399/332 |
| 2005/0129435 | A1 * | 6/2005 | Jaskowiak | 399/333 |
| 2005/0147434 | A1 * | 7/2005 | Tokuzaki | 399/328 |
| 2006/0078352 | A1 * | 4/2006 | Jang et al. | 399/167 |
| 2006/0188291 | A1 * | 8/2006 | Kawakami et al. | 399/167 |
| 2007/0065201 | A1 | 3/2007 | Fujiwara et al. | |
| 2007/0264048 | A1 * | 11/2007 | Kuroda | 399/167 |

(Continued)

FOREIGN PATENT DOCUMENTS

| | | |
|---|---|---|
| JP | 59-017460 | 2/1984 |
| JP | 62-57078 | 7/1987 |
| JP | 58-169239 | 1/1994 |
| JP | 6-263274 | 9/1994 |

(Continued)

*Primary Examiner* — David Gray
*Assistant Examiner* — Francis Gray
(74) *Attorney, Agent, or Firm* — Harness, Dickey & Pierce P.L.C.

(57) ABSTRACT

A fixing device and an image forming apparatus using this, in which even if permanent warping is produced on a roller member that forms a fixing nip portion, no collision sound is produced due to the collision of gears, the fixing device including: two roller members that form a nip portion in which a recording medium is pressed by pressure means and transported; and a drive gear that engages with a shaft portion of one of the two roller members and transmits driving force to that roller member. A key is formed in the drive gear and a key groove having a gap opened therein is formed in the shaft portion, and when a rotation velocity of the roller member increases, transmission of driving force from the drive gear to the shaft portion is suspended and the drive gear slides on the shaft portion.

17 Claims, 9 Drawing Sheets

U.S. PATENT DOCUMENTS

| | | | | |
|---|---|---|---|---|
| 2007/0279888 | A1 | 12/2007 | Nanno et al. | |
| 2007/0285701 | A1 | 12/2007 | Ohta et al. | |
| 2008/0006166 | A1 | 1/2008 | Ohkubo et al. | |
| 2008/0180760 | A1 | 7/2008 | Andoh et al. | |
| 2008/0279603 | A1 * | 11/2008 | Chen | 400/218 |
| 2009/0208261 | A1 * | 8/2009 | Kobayashi et al. | 399/328 |

FOREIGN PATENT DOCUMENTS

| | | | |
|---|---|---|---|
| JP | 10339980 | A * | 12/1998 |
| JP | 2004-333973 | | 11/2004 |
| JP | 2005-016624 | | 1/2005 |
| JP | 2006189735 | A * | 7/2006 |

* cited by examiner

FIXING DEVICE AND IMAGE FORMING APPARATUS USING THIS FIXING DEVICE

BACKGROUND OF THE INVENTION

1. Field of the Invention

The present invention relates to image forming apparatuses such as copier machines, printers, facsimile machines, and multifunction apparatuses that include these, as well as fixing devices used in these image forming apparatuses.

2. Description of the Related Art

Hitherto, technologies have been proposed involving a fixing device installed in an image forming apparatus such as a copier machine and a printer or the like in which a nip portion (fixing nip portion) is formed, which transports a recording medium, by causing two roller members to press against each other, for example, in Japanese Unexamined Paten Application Publication No. 2004-333973. A fixing device such as this is constituted by components such as two roller members (a fixing roller and a pressure roller), a pressure means for causing the two roller members to press against each other, a heater that heats the fixing roller, a heating means such as an exciting coil, and a drive gear that transmits driving force by engaging with one of the two roller members. And by heating the fixing roller using the heating means, a toner image on the recording medium that has been transported to the nip portion is subjected to heat and pressure, thereby fixing it on the recording medium.

On the other hand, the technologies disclosed in Japanese Unexamined Paten Application Publication No. 2004-333973 involve using helical gears and using gears that transfer thrust in the drive gear train, which transmits driving force to the fixing device, for a purpose of carrying out drive transmission to the fixing roller in such a manner that speed fluctuations and noise tend not to occur.

However, with the aforementioned conventional fixing device, when the two roller members are left for a long period in a state pressing against each other, sometimes permanent warping (plasticity deformation) is produced undesirably in a plane form at a position corresponding to the nip portion of the roller members. Then, when rotational drive is performed (when the apparatus is operated) in this state in which permanent warping has been produced in the roller member, the rotation velocity of the roller member sometimes momentarily increases undesirably when the position where permanent warping has been produced reaches the nip portion. In a case such as this, the drive gear installed on a shaft portion of the roller members arrives early with respect to the rotation of a gear that it meshes with (a gear on an upstream side of the drive gear) such that their tooth surfaces collide, thereby producing an undesirable collision sound.

Furthermore, the aforementioned prior art was devised for a purpose of carrying out drive transmission such that speed fluctuations and noise tend not to occur with respect to the fixing roller even when a leading edge side of the recording medium reaches the fixing nip portion and a trailing edge side of the recording medium has reached a transfer nip portion, and does not directly address the aforementioned problems.

SUMMARY OF THE INVENTION

The present invention has been devised to address the aforementioned issues and it is an object thereof to provide a fixing device and an image forming apparatus using this fixing device in which no collision sound is produced due to the collision of gears even when permanent warping has been produced in the roller members that form the fixing nip portion.

In an aspect of the present invention, a fixing device heats and melts a toner image to fix the toner image onto a recording medium and comprises two roller members that form a nip portion in which the recording medium is pressed by pressure means and transported; and a drive gear that engages with a shaft portion of one of the two roller members and transmits driving force to one of the roller members. When a rotation velocity of one of the roller members increases, transmission of driving force from the drive gear to the shaft portion is suspended and the drive gear slides on the shaft portion.

In another aspect of the present invention, an image forming apparatus comprises a fixing device for heating and melting a toner image to fix the toner image onto a recording medium. The fixing device comprises two roller members that form a nip portion in which the recording medium is pressed by pressure means and transported; and a drive gear that engages with a shaft portion of one of the two roller members and transmits driving force to that one of the roller members. when a rotation velocity of one of the roller members increases, transmission of driving force from the drive gear to the shaft portion is suspended and the drive gear slides on the shaft portion.

BRIEF DESCRIPTION OF THE DRAWINGS

The above and other objects, features, and advantages of the present invention will become more apparent from the following detailed description taken with the accompanying drawings in which.

DESCRIPTION OF THE PREFERRED EMBODIMENT(S)

Hereinafter, embodiments of the present invention are described in detail with reference to the accompanying drawings. It should be noted that in these drawings, same numerical symbols are assigned to identical or corresponding portions, and duplicate description thereof is simplified or omitted as appropriate.

Embodiment 1

Embodiment 1 is described in detail using FIG. 1 to FIG. 8.

Figure 1:
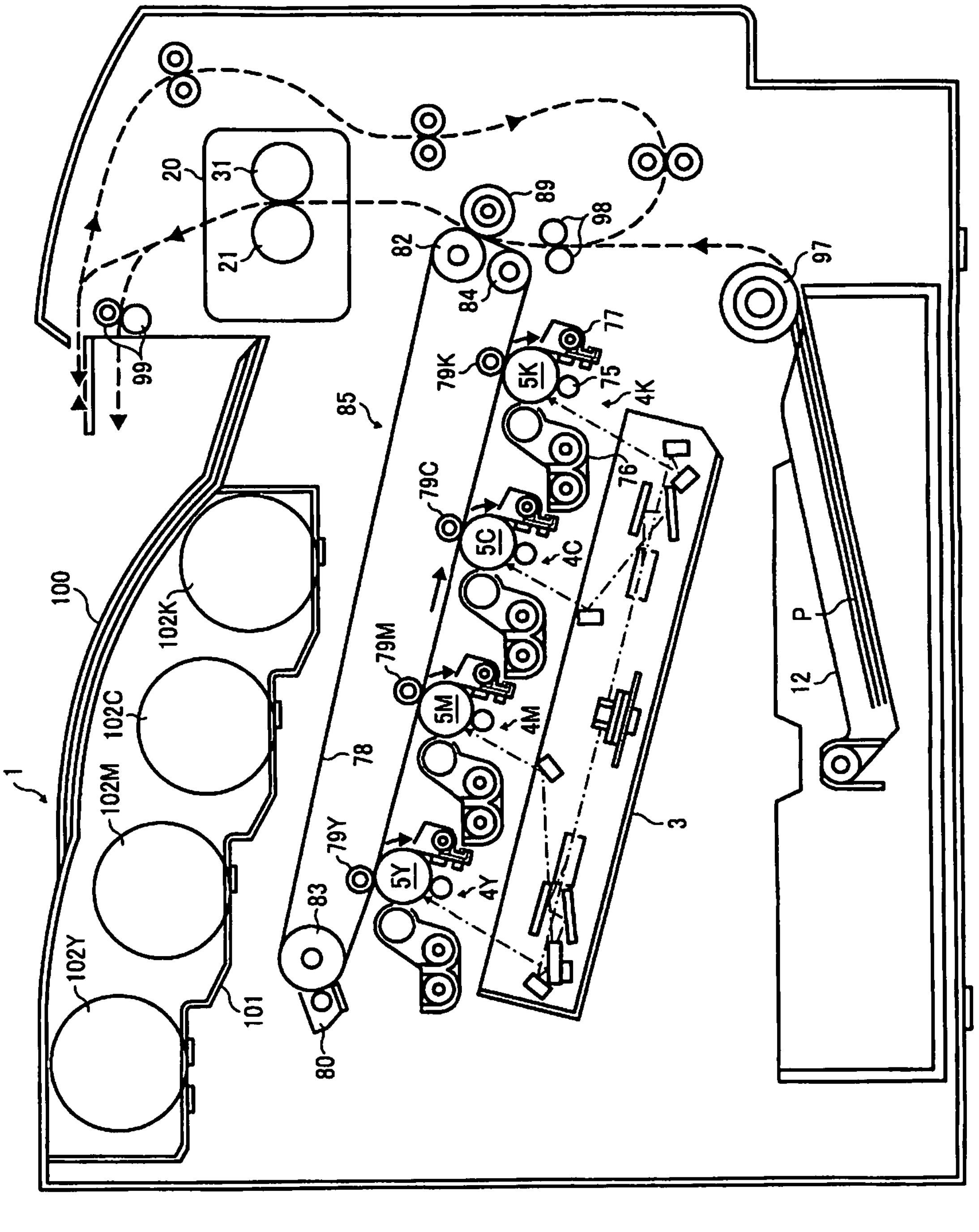
FIG. 1 is a diagram showing an overall configuration of an image forming apparatus according to embodiment 1 of the present invention.

First, description is given using FIG. 1 regarding the overall configuration and operation of the image forming apparatus.

As shown in FIG. 1, an image forming apparatus 1 according to the present embodiment 1 is a tandem-type color printer. Four toner bottles 102Y, 102M, 102C, and 102K corresponding to each color (yellow, magenta, cyan, and black) are removably (exchangeably) installed in a bottle housing portion 101 above the image forming apparatus main unit 1.

An intermediate transfer unit 85 is arranged below the bottle housing portion 101. Image forming portions 4Y, 4M, 4C, and 4K corresponding to each color (yellow, magenta, cyan, and black) are provided in a row arrangement so as to be facing an intermediate transfer belt 78 of the intermediate transfer unit 85.

Photosensitive drums 5Y, 5M, 5C, and 5K are arranged in the image forming portions 4Y, 4M, 4C, and 4K respectively. Furthermore, a charging portion 75, a developing portion 76, a cleaning portion 77, and a charge removing portion (not shown in drawing) and the like are arranged around the photosensitive drums 5Y, 5M, 5C, and 5K respectively. And image forming processes (a charging process, an exposing process, a developing process, a transfer process, and a cleaning process) are carried out on each of the photosensitive drums 5Y, 5M, 5C, and 5K such that an image of the respective color is formed on each of the photosensitive drums 5Y, 5M, 5C, and 5K.

The photosensitive drums 5Y, 5M, 5C, and 5K are rotationally driven by a drive motor not shown in the drawing in a clockwise direction of FIG. 1. And the surfaces of the photosensitive drums 5Y, 5M, 5C, and 5K are uniformly charged (charging process) at a position of the charging portion 75.

After this, the surfaces of the photosensitive drums 5Y, 5M, 5C, and 5K reach irradiation positions of laser lights L, which are emitted from an exposing portion 3, and an electrostatic latent image is formed corresponding to each of the respective colors by exposure scanning at these positions (exposure process).

After this, the surfaces of the photosensitive drums 5Y, 5M, 5C, and 5K reach positions facing developing devices 76, and the electrostatic latent images are developed at these positions such that a toner image of each is formed (developing process).

After this, the surfaces of the photosensitive drums 5Y, 5M, 5C, and 5K reach positions where the intermediate transfer belt 78 and primary transfer bias rollers 79Y, 79M, 79C, and 79K face each other, and the toner images on the photosensitive drums 5Y, 5M, 5C, and 5K are transferred onto the intermediate transfer belt 78 at these positions (primary transfer process). At this time, although miniscule, a small amount of untransferred toner remains on the photosensitive drums 5Y, 5M, 5C, and 5K.

After this, the surfaces of the photosensitive drums 5Y, 5M, 5C, and 5K reach a position facing the cleaning portions 77, and the untransferred toner remaining on the photosensitive drums 5Y, 5M, 5C, and 5K is mechanically recovered by cleaning blades of the cleaning portions 77 at these positions (cleaning process).

Finally, the surfaces of the photosensitive drums 5Y, 5M, 5C, and 5K reach a position facing the charge removing portions, which are not shown in the drawing, and residual electric potential on the surfaces of the photosensitive drums 5Y, 5M, 5C, and 5K is removed at these positions.

In this manner, a series of image forming processes, which are carried out on the photosensitive drums 5Y, 5M, 5C, and 5K, is completed.

After this, the toner images of each color formed on each of the photosensitive drums through the developing process are overlaid and transferred onto the intermediate transfer belt 78. In this manner, a color image is formed on the intermediate transfer belt 78.

Here, the intermediate transfer unit 85 is constituted by components such as the intermediate transfer belt 78, the four primary transfer bias rollers 79Y, 79M, 79C, and 79K, a secondary transfer backup roller 82, a cleaning backup roller 83, a tension roller 84, and an intermediate transfer cleaning portion 80. The intermediate transfer belt 78 spans and is supported by the three rollers 82 to 84, and is endlessly moved in a direction shown by an arrow in FIG. 1 by the rotational drive of the single roller 82.

The four primary transfer bias rollers 79Y, 79M, 79C, and 79K sandwich the intermediate transfer belt 78 between the photosensitive drums 5Y, 5M, 5C, and 5K respectively to form primary transfer nips. And a transfer bias that is opposite to the polarity of the toner is applied to the primary transfer bias rollers 79Y, 79M, 79C, and 79K.

Then, as it travels in the arrow direction, the intermediate transfer belt 78 passes in order the primary transfer nips of each of the primary transfer bias rollers 79Y, 79M, 79C, and 79K. In this manner, the toner images of each color on the photosensitive drums 5Y, 5M, 5C, and 5K are overlaid and undergo primary transfer onto the intermediate transfer belt 78.

After this, the intermediate transfer belt 78, onto which the toner images of each color have been overlaid and transferred, reaches a position facing a secondary transfer roller 89. At this position, the secondary transfer backup roller 82 sandwiches the intermediate transfer belt 78 between the secondary transfer roller 89 to form a secondary transfer nip. Then, the toner image of the four colors that has been formed on the intermediate transfer belt 78 is transferred onto a recording medium P that has been transported to the position of the secondary transfer nip. At this time, untransferred toner that was not transferred to the recording medium P remains on the intermediate transfer belt 78.

After this, the intermediate transfer belt 78 reaches a position of the intermediate transfer cleaning portion 80. And the untransferred toner on the intermediate transfer belt 78 is recovered at this position.

In this manner, a series of transfer processes, which are carried out on the intermediate transfer belt 78, is completed.

Here, the recording medium P that has been transported to the position of the secondary transfer nip is a recording medium that has been transported via rollers such as a paper feeding roller 97 and a pair of registration rollers 98 from a paper feeding portion 12 arranged below the apparatus main unit 1. Specifically, a plurality of sheets of recording media P such as transfer papers or the like are stacked and accommodated in the paper feeding portion 12. Then, when the paper feeding roller 97 is rotationally driven in a counterclockwise direction of FIG. 1, a topmost recording medium P is supplied to between the rollers of the pair of registration rollers 98.

The recording medium P that has been transported to the pair of registration rollers 98 temporarily stops at a roller nip position of the pair of registration rollers 98, whose rotational drive has been stopped. Then, the pair of registration rollers 98 is rotationally driven matched to a timing of the color image on the intermediate transfer belt 78 such that the recording medium P is transported to the secondary transfer nip. In this manner, the desired color image is transferred onto the recording medium P.

After this, the recording medium P onto which the color image has been transferred at the position of the secondary transfer nip is transported to the nip portion of the fixing portion 20 (a position where the fixing roller 21 and the pressure roller 31 press against each other). Then, due to the heat and pressure of the fixing roller 21 and the pressure roller 31 at the nip portion (fixing nip portion), the color image that has been transferred to the surface of the recording medium P is fixed onto the recording medium P.

After this, the recording medium P is discharged outside the apparatus by traveling between the rollers of a pair of discharge rollers 99. The recording medium P that has been discharged outside the apparatus by the pair of discharge rollers 99 is stacked in order on a stack portion 100 as an output image.

In this manner, a series of image forming processes is completed in the image forming apparatus.

Next, detailed description is given with reference to FIG. 2 through FIG. 8 regarding a configuration and operation of a fixing device 20 that is installed in the image forming apparatus main unit 1.

Figure 2:
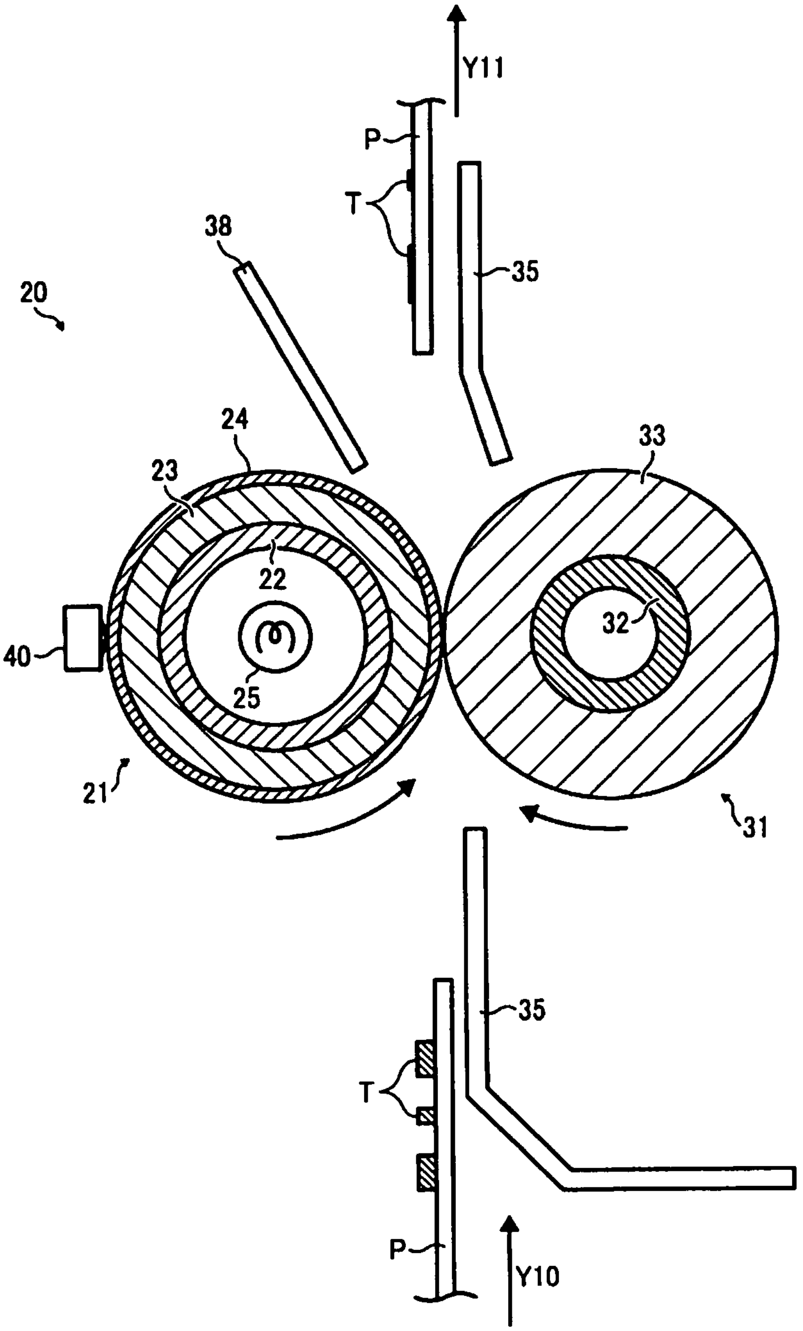
FIG. 2 is a diagram showing a configuration of a fixing device in the image forming apparatus.
Figure 3:
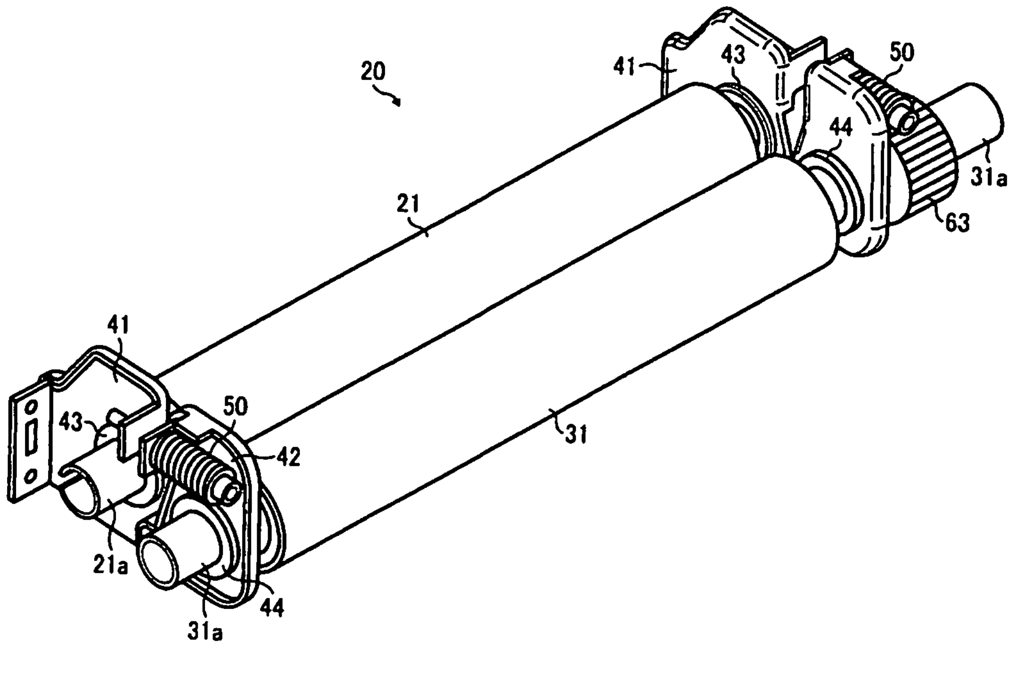
FIG. 3 is a perspective drawing showing an external appearance of the fixing device.

As shown in FIG. 2 and FIG. 3, the fixing device 20 is constituted by components such as the fixing roller 21 (roller member), the pressure roller 31 (roller member), a drive gear 63, frames 41 and 42, shaft bearings 43 and 44, a spring 50, a temperature sensor 40, guide panels 35, and a separation panel 38.

Here, as a roller member, the fixing roller 21 is a thin-walled cylindrical structure that rotates in a direction of an arrow in FIG. 2, and a heater 25 (heat source) is secured inside this cylindrical structure as a heating means. The fixing roller 21 is a multilayered structure in which an elastic layer 23 and a mold release layer 24 have been laminated in order onto a metal core 22, and forms a nip portion by pressing against the pressure roller 31, which is the other roller member. An outer diameter of the fixing roller 21 is set to 35 mm.

The metal core 22 of the fixing roller 21 is formed using an iron-based material such as SUS304.

And elastic materials such as fluororubber, silicone rubber, and foamed silicone rubber or the like may be used as the elastic layer 23 of the fixing roller 21.

Furthermore, PFA (a tetrafluoroethylene-perfluoro alkyl vinyl ether copolymer resin), polyimide, polyetherimide, PES (polyethersulfide) or the like can be used as the mold release layer 24 of the fixing roller 21. By providing the mold release layer 24 on the surface layer of the fixing roller 21, mold release properties (detachability) for a toner T (toner image) are secured.

The heater 25 (heating means) of the fixing roller 21 is a halogen heater and both end portions thereof are secured in the frames of the fixing device 20. And the fixing roller 21 is heated by the heater 25, which undergoes output control by a power source portion (AC power source) of the apparatus main unit 1, such that heat is applied from the surface thereof to the toner image T of the recording medium P. Output control of the heater 25 is carried out based on detection results of the surface temperature of the roller by the temperature sensor 40 (thermistor), which contacts the surface of the fixing roller 21. Specifically, an AC voltage is applied to the heater 25 for an energization time period determined based on the detection results of the temperature sensor 40. Due to the output control of the heater 25, the temperature (fixing temperature) of the fixing roller 21 can be regulated and controlled to a desired temperature (target control temperature).

It should be noted that instead of a contact type thermistor, a noncontact type thermopile or the like can be used for the temperature sensor 40. Also, in order to prevent overheating of the fixing roller 21, a thermostat can be arranged facing the fixing roller 21.

Furthermore, as a roller member, the pressure roller 31 is mainly constituted by a metal core 32 and an elastic layer 33 (having a layer thickness of approximately 0.3 to 2.5 mm) formed via an adhesive layer (having a layer thickness of approximately 50 μm or less) on an outer circumferential surface of the metal core 32. The elastic layer 33 of the pressure roller 31 is formed using a material such as fluororubber, silicone rubber, or foamed silicone rubber or the like. It should be noted that a thin-walled mould release layer (having a layer thickness of approximately 50 μm or less) constituted by PFA or the like may be provided on a surface of the elastic layer 33.

Then, the pressure roller 31 is pressed against fixing roller 21 due to a biasing force of a spring 50 as a pressure means. In this manner, a desired nip portion (fixing nip portion) is formed between the two roller members (the pressure roller 31 and the fixing roller 21). In the present embodiment 1, a nip width of the nip portion is set to approximately 6 mm.

Figure 4:
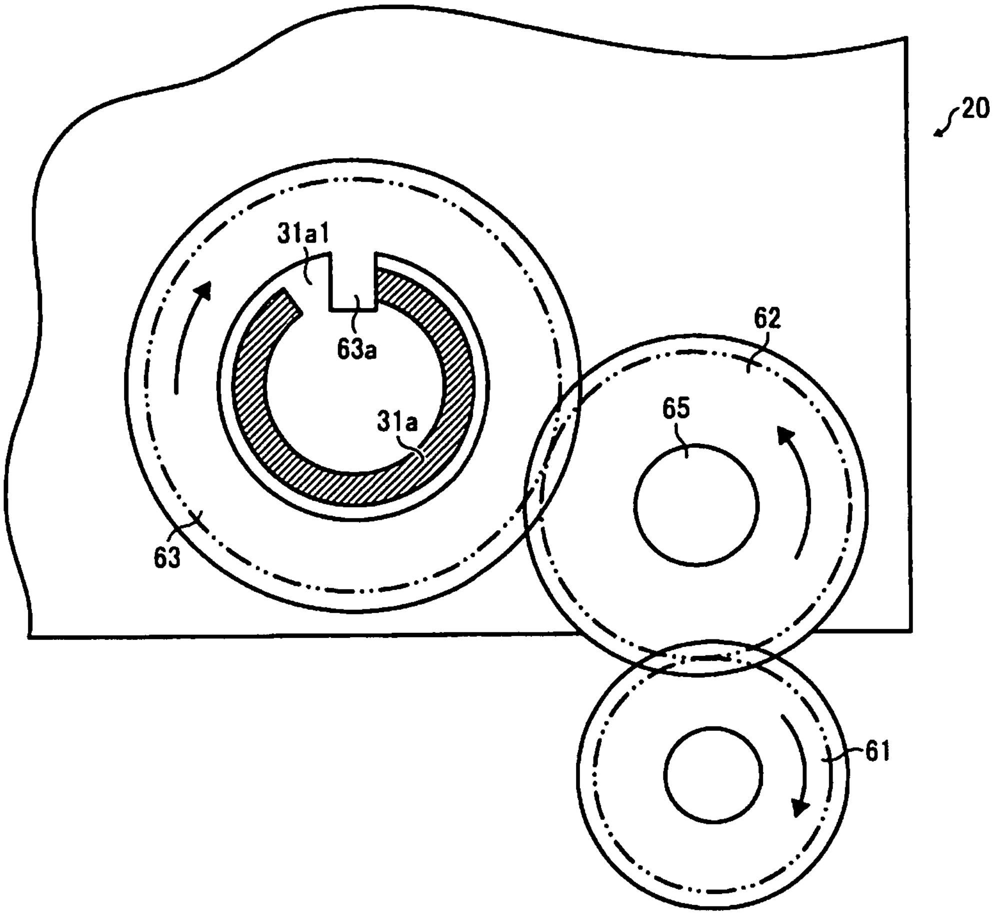
FIG. 4 is a lateral view showing a gear train of the fixing device.
Figure 8:
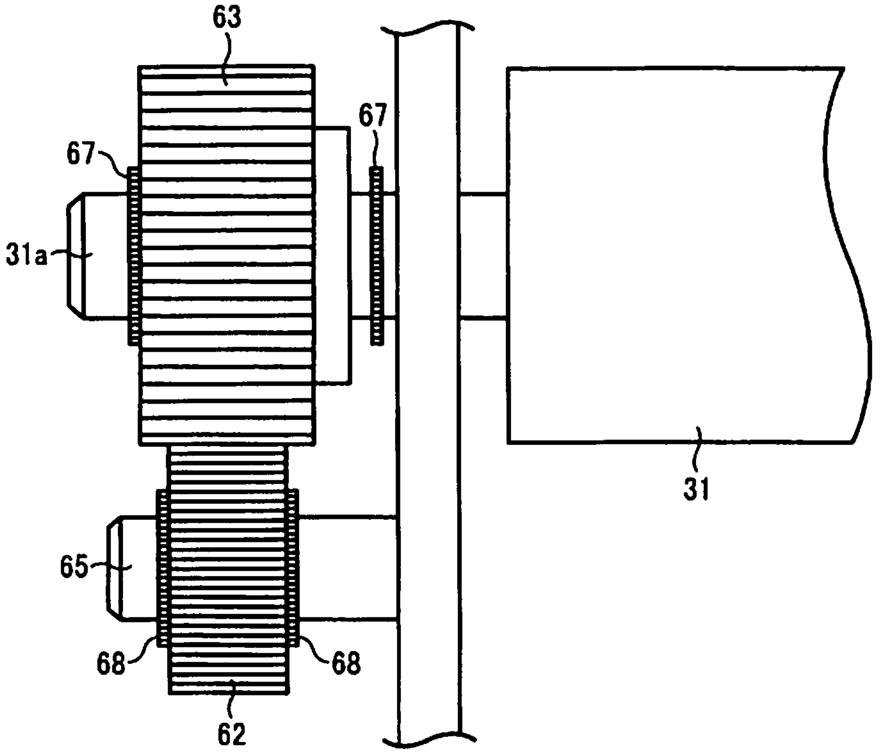
FIG. 8 is a diagram showing a configuration near the drive gear.

Here, as shown in FIG. 3, FIG. 4, and FIG. 8, the drive gear 63 for transmitting driving force to the pressure roller 31 is engaged to a shaft portion 31*a* of the pressure roller 31. Furthermore, an idler gear 62 (a gear that meshes with the drive gear 63) is installed at a stud 65 that protrudes from the frame. Then, driving force is transmitted from a motor gear 61 installed on a motor shaft of the drive motor (not shown in the drawings), which is installed in the apparatus main unit 1, to the drive gear 63 via the idler gear 62, and driving force is further transmitted to the pressure roller 31 from the drive gear 63 such that the pressure roller 31 is rotationally driven. And the fixing roller 21, which presses against the pressure roller 31, is idly rotated due to friction resistance with the pressure roller 31.

It should be noted that a configuration and operation of a drive transmission mechanism by which driving of the pressure roller 31 is carried out is described in detail later.

The guide panels 35 that guide the transport of the recording medium P are arranged respectively at an ingoing side and an outgoing side of the contact portion (nip portion) of the fixing roller 21 and the pressure roller 31. The guide panels 35 are secured to a casing of the fixing device 20.

Furthermore, the separation panel 38 is arranged near the outgoing side of the nip portion, which is a position facing the outer circumferential surface of the fixing roller 21. The separation panel 38 deters a problem of the recording medium P undesirably winding around the fixing roller 21 along with rotation of the fixing roller 21 after the fixing process.

The fixing device 20 configured as described above operates in a following manner.

When a power source switch of the apparatus main unit 1 is turned on, an AC voltage from an AC power source is applied (supplied) to the heater 25, and rotational driving of the fixing roller 21 and the pressure roller 31 commences in the directions of the arrows in FIG. 2.

After this, a recording medium P is sent from the paper feeding portion 12 and an unfixed image is carried onto the recording medium P at the position of the secondary transfer nip. The recording medium P on which the unfixed image T (toner image) is carried is transported in the direction of arrow Y10 in FIG. 2 and is fed into the nip portion (fixing nip portion) of the fixing roller 21 and the pressure roller 31, which are in a state pressing against each other. Then, due to the heat of the fixing roller 21 and the pressing force of the fixing roller 21 and the pressure roller 31, the toner image T is fixed onto the surface of the recording medium P. After this, the recording medium P, which is fed out from the nip portion by the rotating fixing roller 21 and the pressure roller 31, is transported in the direction of arrow Y11.

Below, description is given regarding the configuration and operation of the drive transmission mechanism, which is a feature of the fixing device 20 according to the present embodiment 1.

With reference to FIG. 5, the fixing device according to the present embodiment 1 is configured such that when the rotation velocity of the pressure roller 31 increases, transmission of driving force from the drive gear 63 to the shaft portion 31*a* is suspended and the drive gear 63 slides on the shaft portion 31*a*.

Specifically, a key 63*a* that protrudes toward the rotational center is formed at an inner diameter portion of the drive gear 63. Also, a key groove 31*a*1, which is formed so as to be engageable with the key 63*a*, is provided at the shaft portion 31*a* of the pressure roller 31. Here, the key 63*a* and the key groove 31*a*1 are formed having a predetermined gap in a rotational direction. That is, the key 63*a* and the key groove 31*a*1 do not contact and engage without a gap, but rather contact and engage on only one side in the rotational direction (a state shown in FIG. 5A).

Figure 5A:
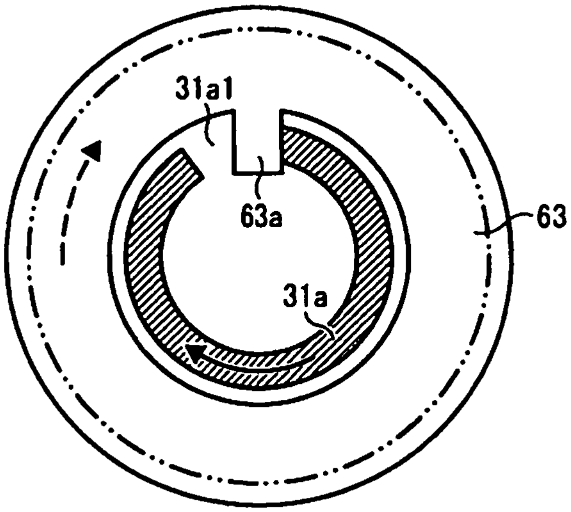
FIGS. 5A and 5B are diagrams for describing operations of a drive gear.

Then, normally, driving force is transmitted from the drive gear 63 to the shaft portion 31*a* in a state in which only one side in the rotational direction of the key 63*a* and the key groove 31*a*1 contact (engage) such that the pressure roller 31 is rotationally driven (the state shown in FIG. 5A). In contrast to this, when the rotation velocity of the pressure roller 31 (shaft portion 31*a*) suddenly increases, the engagement of the key 63*a* and the key groove 31*a*1 is temporarily released such that the drive gear 63 slides relatively on the shaft portion 31*a*. Due to this, the transmission of driving force from the drive gear 63 to the shaft portion 31*a* is suspended (a state shown in FIG. 5B).

Here, a phenomenon in which the rotation velocity of the pressure roller 31 temporarily increases is produced in a case where permanent warping A (refer to FIG. 6) has occurred undesirably in a plane form at a position corresponding to the nip portion of the pressure roller 31 when the fixing roller 21 and the pressure roller 31 (the two roller members) have been left for a long period in a state pressing against each other.

Figure 5B:
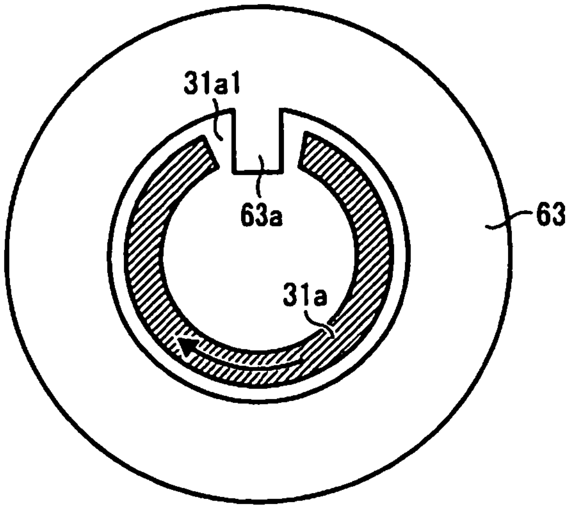
Figure 6A:
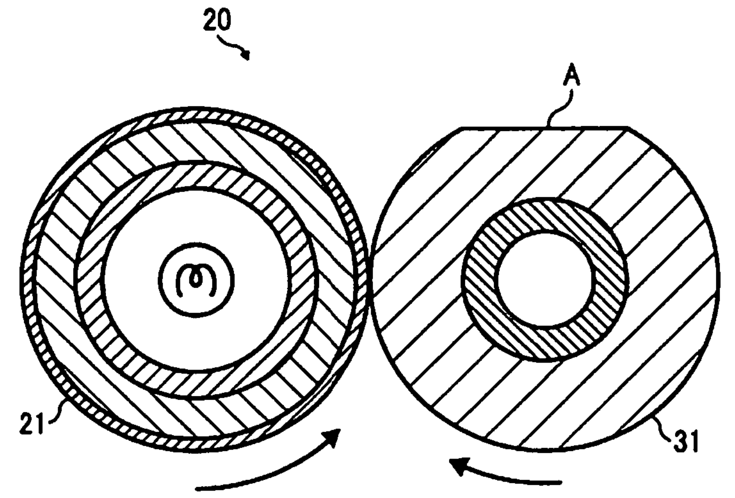
FIGS. 6A and 6B are diagrams showing states in which permanent warping has been produced in a pressure roller.
Figure 6B:
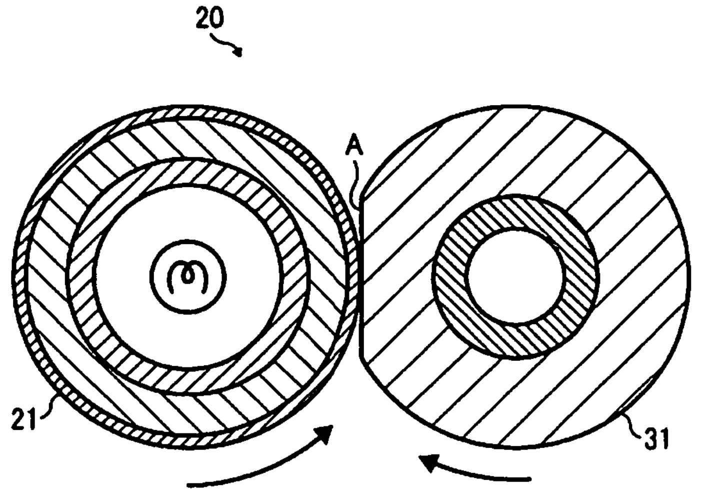

Specifically, as shown in FIG. 6A, when the fixing device 20 is operated and the permanent warping A has not reached the nip portion, no fluctuation is produced in the rotation velocity of the pressure roller 31. At this time, the key 63*a* and the key groove 31*a*1 are engaged as shown in FIG. 5A and drive transmission is carried out from the drive gear 63 to the pressure roller 31. In contrast to this, immediately after the permanent warping A has reached the nip portion as shown in FIG. 6B, since the pressure roller 31 rotates undesirably due to the pressing force of a pressure mechanism regardless of the rotational driving force, the rotation velocity of the pressure roller 31 momentarily increases. At this time, the engagement of the key 63*a* and the key groove 31*a*1 is released as shown in FIG. 5B and drive transmission from the drive gear 63 to the pressure roller 31 is suspended. Due to this, a problem is deterred in which, along with an increased rotation velocity of the pressure roller 31, the rotation velocity of the drive gear 63 also increases such that the drive gear 63 arrives early with respect to the rotation of the upstream side idler gear 62 and the teeth surfaces of the gears collide and produce an undesirable collision sound.

It should be noted that a rotational direction length of the key groove 31*a*1 is limited, and therefore, as shown in FIG. 5B, the state in which the engagement of the key 63*a* and the key groove 31*a*1 has been released finishes by the key 63*a* contacting the other end side of the key groove 31*a*1. That is, the drive gear 63 slides on the shaft portion 31*a* by only a predetermined angle, after which the transmission of driving force from the drive gear 63 to the shaft portion 31*a* (pressure roller 31) resumes.

Figure 7:
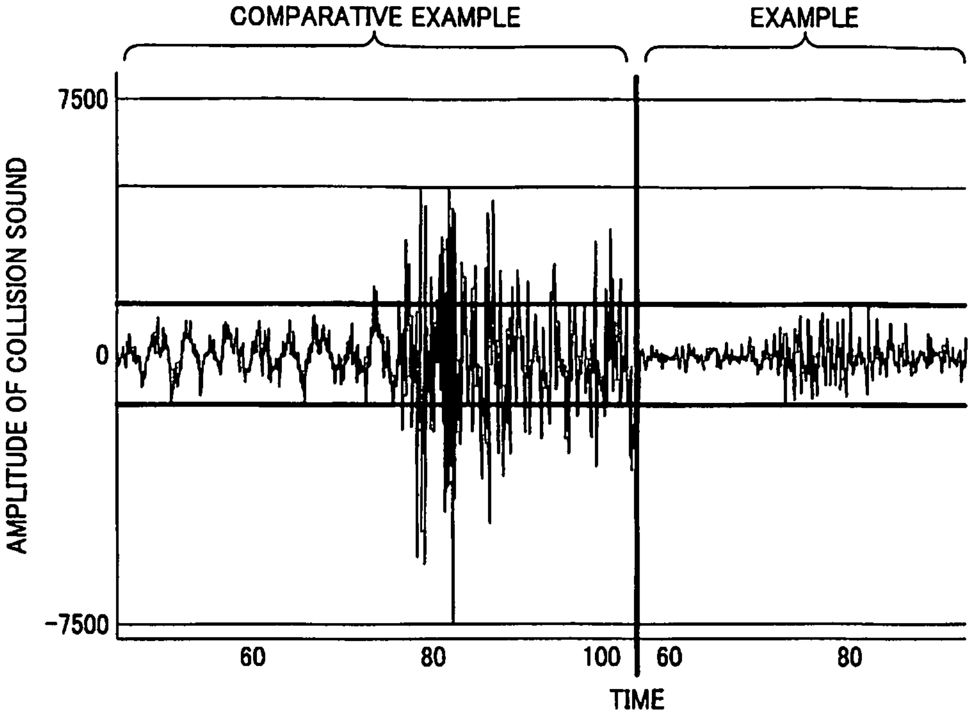
FIG. 7 is a graph showing test results.

FIG. 7 is a graph showing results of testing carried out by the present inventors for confirming the aforementioned effect (an effect by which the collision sound of the drive gear 63 is reduced).

The testing in FIG. 7 involved confirming an extent of the collision sound of the drive gear 63 in the fixing device in a state in which permanent warping had been produced in the pressure roller. In FIG. 7 the horizontal axis indicates time and the vertical axis indicates an amplitude of collision sound. Furthermore, in FIG. 7, "example" refers to the test results when using the fixing device 20 according to the present embodiment 1 (in which the rotational direction length of the key 63*a* is set to 4 mm and the rotational direction length of the key groove 31*a*1 is set to 6 mm) and "comparative example" refers to the test results when using a fixing device in which the key and the key groove are engaged without a gap (in which the rotational direction length of the key 63*a* is set to 4 mm and the rotational direction length of the key groove 31*a*1 is set to 4 mm).

From the test results of FIG. 7 it is evident that, in contrast to the comparative example in which large collision sounds are produced, no large collision sounds are produced in the example (one third or less the amplitude of the comparative example).

It should be noted that in the present embodiment 1, with reference to FIGS. 5A and 5B, a minute gap is provided between the inner diameter portion of the drive gear 63 and the outer diameter portion of the shaft portion 31*a* (a gap larger than a fitting tolerance in an ordinary running fit). Due to this, when the rotation velocity of the pressure roller 31 increases, no large friction resistance is produced between the drive gear 63 and the shaft portion 31*a*, and the drive gear 63 slides smoothly on the shaft portion 31*a*. Accordingly, the above-described effect is achieved reliably.

Furthermore, with reference to FIG. 8, the present embodiment 1 is configured such that the drive gear 63 can move by a predetermined amount in the thrust direction (lateral direction in FIG. 8) with respect to the shaft portion 31*a* of the pressure roller 31. Specifically, a thrust direction gap between retaining rings 67, which are installed on both sides of the drive gear 63, and the drive gear 63 is set slightly larger.

With this configuration, when the rotation velocity of the pressure roller 31 increases, no large friction resistance is produced between the drive gear 63 and the retaining rings 67 and the drive gear 63 slides smoothly on the shaft portion 31*a*. Accordingly, the above-described effect is achieved reliably.

Furthermore, with reference to FIG. 8, in the present embodiment 1, retaining rings 68 are installed as restraining members that restrain movement of the idler gear 62 (a gear that meshes with the drive gear 63) in the thrust direction (lateral direction in FIG. 8) with respect to the shaft portion 31*a* of the pressure roller 31. Specifically, these are set such that almost no gap is produced in the thrust direction between the retaining rings 68, which are installed on both sides of the idler gear 62, and the idler gear 62. Here, for example, the idler gear 62 may be caused to contact the retaining ring 68 on one side using a spring washer or the like.

With this configuration, even if the rotation velocity of the pressure roller 31 increases and the drive gear 63 collides with the idler gear 62, a problem can be deterred in which an unusual sound is produced by the idler gear 62 moving in the thrust direction due to that impact and colliding with the retaining ring 68.

As described above, the present embodiment 1 is configured such that, when the rotation velocity of the pressure roller 31 (roller member) increases, the transmission of driving force from the drive gear 63 to the shaft portion 31*a* of the pressure roller 31 is suspended and the drive gear 63 slides on the shaft portion 31*a*, and therefore even if permanent warping is produced on the pressure roller 31 that forms the fixing nip portion, the problem in which a collision sound is produced due to the collision of these gears can be deterred.

It should be noted that in the present embodiment 1, the present invention was applied to a fixing device in which the fixing roller 21 is used as a fixing member and the pressure roller 31 is used as a pressure member, but the present invention can also be applied to a fixing device in which a fixing belt is used as the fixing member, or a fixing device in which a pressure belt is used as the pressure member. That is, even for a fixing device configured such that the fixing nip portion is formed by pressing two roller members against each other through endless belt members (a fixing belt and a pressure belt), by configuring this in a same manner as the present embodiment 1 such that, when the rotation velocity of the roller member increases, the transmission of driving force from the drive gear to a shaft portion of the roller member is suspended and the drive gear slides on the shaft portion, an equivalent effect as in the present embodiment 1 can be achieved.

Furthermore, in the present embodiment 1, the present invention was applied to the fixing device 20 in which the drive gear 63 was installed at the pressure roller 31, but naturally the present invention can be applied also to a fixing device in which a drive gear is installed at the fixing roller 21. In this case also, by configuring in a manner such that, when the rotation velocity of the fixing roller 21 increases, the transmission of driving force from the drive gear to the shaft portion 21*a* of the fixing roller 21 is suspended and the drive gear slides on the shaft portion 21*a*, an equivalent effect as in the present embodiment 1 can be achieved.

Furthermore, in the present embodiment 1, the key 63*a* is formed in the drive gear 63 and the key groove 31*a*1 is formed in the shaft portion 31*a*, but it is also possible to form a key groove in the drive gear 63 and to form a key in the shaft portion 31*a*. In this case also, by forming a predetermined gap in the rotational direction between the key groove in the drive gear 63 and the key in the shaft portion 31*a*, an equivalent effect as in the present embodiment 1 can be achieved.

Embodiment 2

Figure 9A:
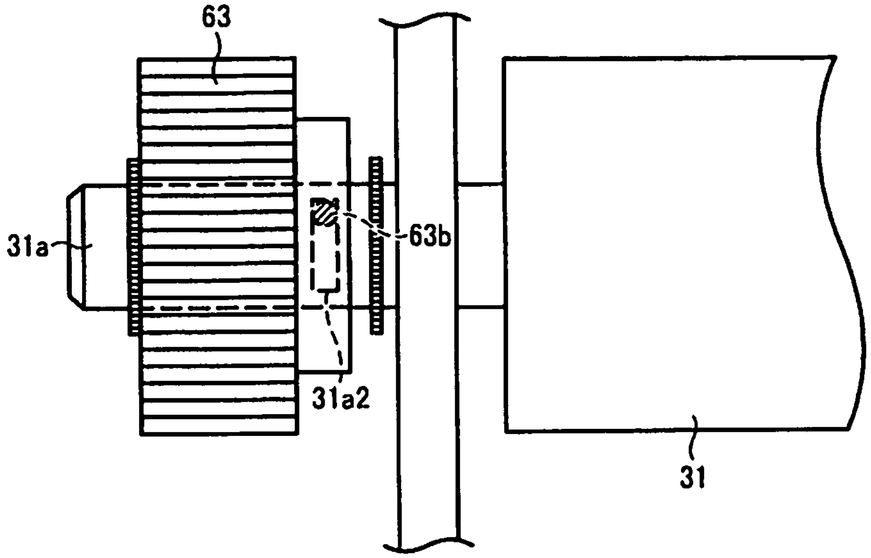
FIGS. 9A and 9B are diagrams showing a configuration near a drive gear of a fixing device according to embodiment 2 of the present invention.
Figure 9B:
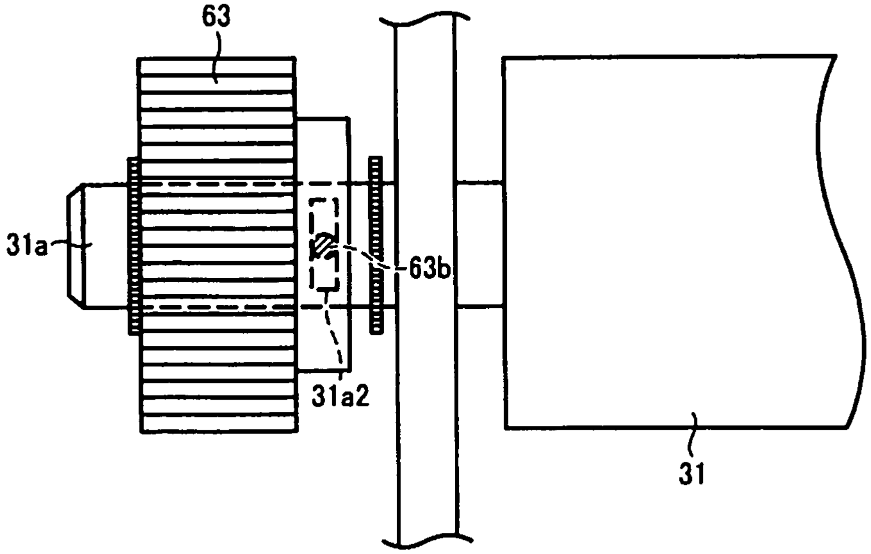

Detailed description is given using FIGS. 9A and 9B regarding an embodiment 2 of the present invention.

FIGS. 9A and 9B are diagrams corresponding to FIG. 8 in the above-described embodiment 1.

A fixing device according the present embodiment 2 is different from that of the above-described embodiment 1, in which the key 63*a* was installed in the drive gear 63 and the key groove 31*a*1 was formed in the shaft portion 31*a*, in that a pin 63*b* is installed in the drive gear 63 and an elongated hole 31*a*2 is formed in the shaft portion 31*a*.

In a same manner as the above-described embodiment 1, the fixing device according to the present embodiment 2 is configured using components such as the fixing roller 21 (roller member), the pressure roller 31 (roller member), and the drive gear 63. And the fixing device according to the present embodiment 2 is also configured such that, when the rotation velocity of the pressure roller 31 increases, transmission of driving force from the drive gear 63 to the shaft portion 31*a* is suspended and the drive gear 63 slides on the shaft portion 31*a*.

Here, with reference to FIGS. 9A and 9B, in the present embodiment 2, the pin 63*b* is installed the inner diameter portion of the drive gear 63. Specifically, a pass-through hole is formed at a bottom portion of the drive gear 63 and the pin 63*b* is press fitted into this pass-through hole. The pin 63*b* is installed so as to protrude from the inner diameter portion toward the rotational center.

Furthermore, the elongated hole 31*a*2, which is formed so as to be engageable with the pin 63*b*, is provided in the shaft portion 31*a* of the pressure roller 31. Here, the pin 63*b* and the elongated hole 31*a*2 are formed having a predetermined gap in the rotational direction. That is, the pin 63*b* and the elongated hole 31*a*2 do not contact and engage without a gap, but rather contact and engage only on one side in the rotational direction (a state shown in FIG. 9A).

Then, normally, driving force is transmitted from the drive gear 63 to the shaft portion 31*a* in a state in which only one side in the rotational direction of the pin 63*b* and the elongated hole 31*a*2 contact (engage) such that the pressure roller 31 is rotationally driven (the state shown in FIG. 9A).

In contrast to this, when the rotation velocity of the pressure roller 31 (shaft portion 31*a*) increases, the engagement of the pin 63*b* and the elongated hole 31*a*2 is temporarily released such that the drive gear 63 slides relatively on the shaft portion 31*a*. Due to this, the transmission of driving force from the drive gear 63 to the shaft portion 31*a* is suspended (a state shown in FIG. 9B).

Furthermore, in the present embodiment 2, the pin 63*b* is formed in the drive gear 63 and the elongated hole 31*a*2 is formed in the shaft portion 31*a*, but it is also possible to form an elongated hole in the drive gear 63 and to form a pin in the shaft portion 31*a*. In this case also, by forming a predetermined gap in the rotational direction between the elongated hole of the drive gear 63 and the pin of the shaft portion 31*a*, an equivalent effect as in the present embodiment 2 can be achieved.

As described above, the present embodiment 2 is configured such that, when the rotation velocity of the pressure roller 31 (roller member) increases, the transmission of driving force from the drive gear 63 to the shaft portion 31*a* of the pressure roller 31 is suspended and the drive gear 63 slides on the shaft portion 31*a*, and therefore even if permanent warping is produced on the pressure roller 31 that forms the fixing nip portion, the problem in which a collision sound is produced due to the collision of these gears can be deterred.

It should be noted that in the above-described embodiments, the present invention was applied to the fixing device 20 in which the heater 25 was used as the heating means, but naturally the present invention can be applied also to a fixing device having an electromagnetic induction heating system using an exciting coil as a heating means.

The present invention enables a fixing device and an image forming apparatus using this to be provided that is configured such that, when the rotation velocity of the roller member increases, the transmission of driving force from the drive gear to the roller member is suspended and the drive gear slides on the shaft portion, and therefore even if permanent warping is produced on the roller member that forms the fixing nip portion, no collision sound is produced due to the collision of these gears.

Various modifications will become possible for those skilled in the art after receiving the teachings of the present disclosure without departing from the scope thereof.

What is claimed is:

1. A fixing device for heating and melting a toner image to fix the toner image onto a recording medium, comprising:

two roller members that form a nip portion in which the recording medium is pressed by a pressure device and transported thereof; and a drive gear that engages with a shaft portion of one of the two roller members and transmits driving force to one of the two roller members, wherein the drive gear includes a key that protrudes toward a rotational center and is integrally formed with the drive gear as a single unit at an inner diameter portion of the drive gear, a gap is provided in a co-axial direction between an inner diameter portion of the drive gear and an outer diameter portion of the shaft portion, when a rotation velocity of the two roller members is normal, transmission of driving force from the drive gear to the shaft portion is rotationally driven via contacting and engaging at most one side in a rotational direction; and when a rotation velocity of one of the two roller members increases, transmission of the driving force from the drive gear to the shaft portion is suspended and the drive gear slides freely on the shaft portion.

2. The fixing device according to claim 1, wherein, when the rotation velocity of one of the two roller members increases, the drive gear slides on the shaft portion by a set angle, after which transmission of driving force from the drive gear to the shaft portion recommences.

3. The fixing device according to claim 1, wherein the shaft portion is formed so as to be able to engage with the key of the drive gear, and is provided with a key groove in which a set gap is formed in a rotational direction.

4. The fixing device according to claim 1, wherein a pin or an elongated hole is provided at an inner diameter portion of the drive gear, and the shaft portion is formed so as to be able to engage with the pin or the elongated hole of the drive gear, and is provided with an elongated hole or a pin in which a set gap is formed in a rotational direction.

5. The fixing device according to claim 1, wherein the drive gear can move by a set amount in a thrust direction with respect to the shaft portion.

6. The fixing device according to claim 1, further comprising a restraining member that restrains thrust direction movement of a gear that meshes with the drive gear.

7. The fixing device according to claim 1, wherein the two roller members comprise a fixing roller and a pressure roller.

8. The fixing device according to claim 1, wherein the two roller members form the nip portion by pressing against each other through an endless belt member.

9. An image forming apparatus comprising a fixing device that heats and melts a toner image to fix the toner image onto a recording medium, the fixing device including:

two roller members that form a nip portion in which the recording medium is pressed by a pressure device and transported thereof; and a drive gear that engages with a shaft portion of one of the two roller members and transmits driving force to that one of the two roller members, wherein the drive gear includes a key that protrudes toward a rotational center and is integrally formed with the drive gear as a single unit at an inner diameter portion of the drive gear, a gap is provided in a co-axial direction between an inner diameter portion of the drive gear and an outer diameter portion of the shaft portion, when a rotation velocity of the two roller members is normal, transmission of driving force from the drive gear to the shaft portion is rotationally driven via contacting and engaging at most one side in a rotational direction; and when a rotation velocity of one of the two roller members increases, transmission of the driving force from the drive gear to the shaft portion is suspended and the drive gear slides freely on the shaft portion.

10. The fixing device according to claim 5, further comprising retaining members installed on both sides of the drive gear.

11. The fixing device according to claim 6, wherein the gear is installed on a stud that protrudes from a frame.

12. The fixing device according to claim 6, wherein the gear is an idler gear.

13. The fixing device according to claim 6, wherein more than one restraining member is provide on the shaft portion.

14. The fixing device according to claim 13, wherein the restraining members are installed on both sides of the gear.

15. The fixing device according to claim 1, further comprising guide panels that guide the transport of the recording medium arranged respectively at an upstream side and a downstream side of the nip portion of the two roller members.

16. The fixing device according to claim 1, further comprising a separation panel arranged near a downstream side of the nip portion of the two roller members.

17. The fixing device according to claim 16, wherein the separation panel is positioned facing an outer circumferential surface of one of the two roller members.

* * * * *